April 29, 1930.                     C. L. LEE                     1,756,911
                              METALLIC BELLOWS
                             Filed Dec. 3, 1925

Inventor
Charles L. Lee,

By Spencer Sewall & Hardin
                                    Attorneys

Patented Apr. 29, 1930

1,756,911

UNITED STATES PATENT OFFICE

CHARLES L. LEE, OF DETROIT, MICHIGAN, ASSIGNOR TO GENERAL MOTORS RESEARCH CORPORATION, OF DETROIT, MICHIGAN, A CORPORATION OF DELAWARE

METALLIC BELLOWS

Application filed December 3, 1925. Serial No. 73,067.

This invention relates to the form and structure of a metallic bellows adapted to withstand the strain of rapid expansion and contraction for very long periods without danger of rupture.

It consists in the particular form of the walls of a tubular metallic bellows, and more particularly in the contour of the circumferential ridges and alternating grooves that form the corrugations, which is such that the bending stresses applied in the expansion and contraction of the bellows will be distributed mainly over the entire area of the corrugations instead of being confined to circumferential lines of flexure near the outer and inner edges of the corrugations.

In the accompanying drawings, in which like reference characters indicate like parts throughout its several views.

Figure 2:
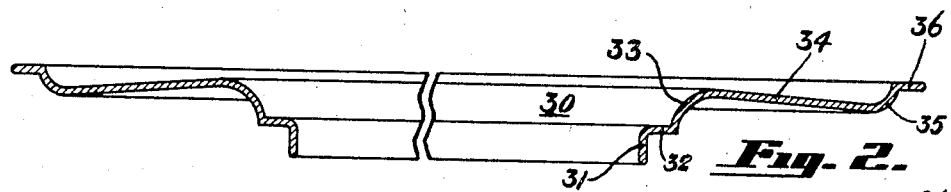
Figs. 2 and 3 are sections of the two kinds of elements, of which the bellows illustrated is mainly composed, as they appear before being assembled.
Figure 3:

In the embodiment illustrated, which is that now preferred, 20 indicates a bellows tube in its normal form (the form it assumes when not acted on by unbalanced forces), without end attachments, constructed of a plurality of pairs of annular plate like elements composed of sheet metal punched from flat sheets and pressed into the forms shown in Figs. 2 and 3. The element or plate indicated by numeral 21 in Fig. 3 has an outer peripheral flange 22 of cylindrical form merging into an annular flat surface 23 normal to the axis of the cylindrical flange 22 and the entire element. Immediately inside of this flat portion 23, the plate is curved or dished at 24 in an annular zone, curved in any radial plane in an arc of somewhat over 90 degrees. Said plate is pressed into conoidal form as at 25, the intersection of any radial plane with the surface of said conoidal portion being a line tangential to the radial curvature of the zone 24. The conoidal part 25 extends inward to a circular line near the inner periphery of the element where radial lines on said conoidal portion become substantially tangent to another annular zone or dished portion 26 curved in radial planes to an angular extent somewhat more than 90 degrees and in a direction reverse of the curvature of the zone 24. The dished zone 26 terminates in a flat flange-like portion 27 which is in a plane parallel to, but offset with respect to the portion 23.

Element or plate 30 illustrated in Fig. 2 is similarly formed with inner and outer annular zones radially curved, but element 30 has a cylindrical flange 31 at its inner periphery instead of at its outer periphery as at 22 in plate 21. The relation of the flanges and curved zones is such that the plates may be assembled with curves reversed with respect to each other as shown in the drawings. The flat portion or flange 32 of element 30 corresponds to the flange 27 of plate 21 and rests in contact with it when the two elements are assembled; the annular zone or dished portion 33 corresponds to the portion 26 of plate or element 21; the conoidal part 34 and the dished annular zone 35 to the dished zone 24 of element or plate 21. The peripheral plane flange 36 corresponds to the flat part 23 of element 21 and fits in contact with the part 23 of a matched plate 21.

The bellows is made by stacking plates 21 and 30 alternately, the flange 22 fitting over the outer edge of plane flange 36 of plate 30, and the flange 31 of plate 30 extending through the central opening in plate 21, said flange fitting about the flat flange 27 of said plate. When sufficient plates have been stacked, to bring the bellows to the required length, each cylindrical flange 22 and 31 of plates 21 and 30, respectively, are spun over the adjacent flat flanges 36 and 27. The several joints may then be soldered.

It is, of course, obvious that each joint can be made and soldered separately, but the preferred method is to apply solder paste to the flanges, or tin them during or before the stacking; then to spin the cylindrical flanges over the mating flat ones and, by heating the whole assembly, solder all of the joints in one operation.

It should be noted that the bellows of the form shown has its convolutions so separated that the radial-section curve formed by dished portions 26 and 33, and forming the bottom of the curve of a corrugation, has a longer radius than the radial-section curve adjacent the edge of the ridges formed by dished portions 24 and 35. The dished portions 24—35 and 26—33 individually forming an arc somewhat over 90° of a circle, as has been mentioned before, will, when assembled, form in radial section curves of slightly more than 180 degrees. Thus, in the normal or untensioned condition of the bellows, the external grooves are wider at their bottoms than at their tops, or wider at their closed edges than at their open ones,—that is, measured longitudinally of the axis of the bellows,—while the internal grooves (within the ridges) are reversely proportioned. The ratio of the radius of the semi-circular cross-section formed by dished portions 24 and 35 to the radius of the semi-circular cross-section formed by dished portions 26 and 33, is substantially equal to the ratio of the diameter of the central opening in the plates to the diameter of the outer edge of the plates.

By constructing the bellows in this proportion, the bending stresses occasioned by extension and compression of the bellows are distributed more largely upon the conoidal portions 25 and 34 of the various plates than in similar known structures and, consequently, a longer life of the bellows obtains. In other words, the radial curvatures of zones 24 and 35, and 26 and 33 are proportioned substantially to compensate for the differences in the amounts of metal in the two chief bending regions of the plates owing to their difference in circumferential extent. Thus, continual contraction and expansion of the bellows will tend to flex the conoidal portions 25 and 34 to a substantially greater degree than the dished portions, the flexing of the plates being gradually diminished in the direction of the juncture between adjacent plates.

Figure 1:
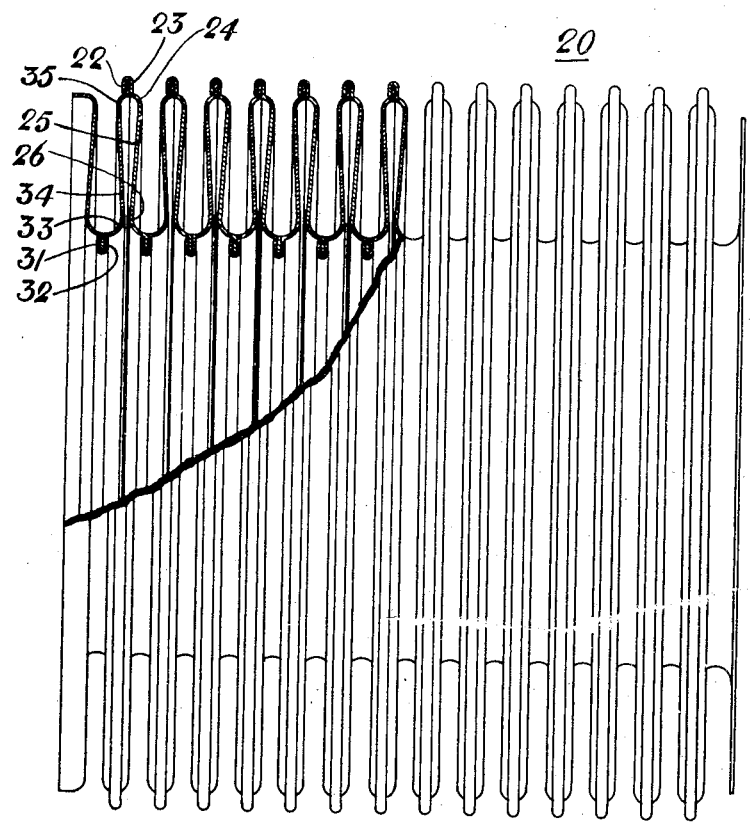
Fig. 1 is a side view, partly in section, of a metallic bellows made of a plurality of assembled annular sheet metal elements.

In Fig. 1, the two extreme plates may be so constructed that the bellows may be attached to any desirable device. The element to the left (as viewed in Fig. 1) has an outer cylindrical flange, which may be spun over the edge of any device to which this end of the bellows is to be secured, while the opposite extreme plate is provided with a wide flat flange which may be secured to any device by means of clamping, screwing, or any other suitable manner.

The present form of metallic bellows is peculiarly adapted to be used in devices including a bellows which is subjected to rapid changes in shape or length. It has been successfully used in connection with fuel pumps of the type disclosed in the copending application of Charles F. Kettering and Charles L. Lee, Patent No. 1,607,200, November 16, 1926, in which the bellows displacement member is operated at comparatively high speed.

While the form of embodiment of the invention as herein disclosed, constitutes a preferred form, it is to be understood that other forms might be adopted, all coming within the scope of the claims which follow.

What is claimed is as follows:

1. A metallic bellows in the form of a tube with circumferential corrugations, the tops of the ridges and the bottoms of the grooves of the corrugations being curved upon arcs of circles of different radii, and the ratio of the radius of the bottom of the groove to the radius of the top of the ridge being in the neighborhood of the ratio of the diameter of the outer circle of the tube forming the tops of said ridges to the diameter of the inner circle of the tube forming the bottoms of the grooves.

2. A metallic bellows in the form of a tube with circumferential corrugations, the tops of the ridges and the bottoms of the grooves of the corrugations being curved upon arcs of circles of different radii, and having the curved bottoms and tops of the grooves connected by intermediate conoidal portions, the difference between said radii being such as to compensate for the difference in the amounts of metal in the curved portions.

3. A metallic bellows comprising a tubular body having circumferential corrugations forming external grooves separated by ridges that inclose internal grooves; the bottoms of said internal and external grooves being curved in longitudinal radial planes forming substantially equal curved areas.

4. A bellows as defined in claim 3, having substantially conoidal portions lying between and substantially tangential to the portions curved in radial planes.

5. A bellows as defined in claim 3 having substantially conoidal portions lying between and substantially tangential to the curved portions, the bottoms of both external and internal grooves being wider, measured longitudinally of the axis of the bellows, than their open edges.

6. A bellows as defined in claim 3, said bellows being composed of reversely matched sheet metal elements united by interlocked seams.

In testimony whereof I affix my signature.

CHARLES L. LEE.